(12) United States Patent
Kimura et al.

(10) Patent No.: US 11,978,306 B2
(45) Date of Patent: May 7, 2024

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Yuito Kimura, Tokyo (JP); Gen Takubo, Tokyo (JP); Haruka Fukai, Tokyo (JP); Kohei Negishi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 270 days.

(21) Appl. No.: 17/451,244

(22) Filed: Oct. 18, 2021

(65) Prior Publication Data

US 2022/0036696 A1    Feb. 3, 2022

Related U.S. Application Data

(63) Continuation of application No. PCT/JP2020/015947, filed on Apr. 9, 2020.

(30) Foreign Application Priority Data

Apr. 26, 2019   (JP) .................. 2019-086661

(51) Int. Cl.
G07F 17/32       (2006.01)
G06F 21/31       (2013.01)
G06F 21/44       (2013.01)

(52) U.S. Cl.
CPC .......... *G07F 17/3227* (2013.01); *G06F 21/31* (2013.01); *G06F 21/44* (2013.01);
(Continued)

(58) Field of Classification Search
CPC ...... G07F 17/3227; G06F 21/31; G06F 21/44; G06F 2221/2109; G06F 2221/2141
(Continued)

(56) References Cited

U.S. PATENT DOCUMENTS 8,651,957 B2 *  2/2014   Goldman ............ G07F 17/3274
                                                       463/4
11,107,569 B1 *  8/2021   Devoto .................. G16H 40/67
(Continued)

FOREIGN PATENT DOCUMENTS

JP    2018000935 A    1/2018
JP    2018092492 A    6/2018
(Continued)

OTHER PUBLICATIONS

"Frontier of Knight and Wing" Easy registration function implemented today, "cumulative login bonus", etc; Feb. 21, 2018 <https://www.4gamer.net/games/405/G040530/20180220089/> (9 pages).
(Continued)

*Primary Examiner* — Allen Chan
(74) *Attorney, Agent, or Firm* — Osha Bergman Watanabe & Burton LLP

(57) ABSTRACT

A non-transitory computer readable medium stores a program causing a computer to execute: storing login information when a player performs a login for the first time in a particular time frame; granting a right when a login is performed every certain time period in the particular time frame; and granting, in the case where the login information is not stored and the certain time period in which the right is not granted has elapsed when a login is performed in the particular time frame, the right on the basis of the certain time period in which the right is not granted.

7 Claims, 20 Drawing Sheets

| PARTICULAR TIME FRAME (DAYS) | | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | TOTAL |
| PATTERN A | O | O | O | O | O | O | O | O | O | O | O | O | O | O | 140 TIMES |
| PATTERN B | X | X | X | X | X | O | O | O | O | O | O | O | O | O | 140 TIMES |
| PATTERN C | O | O | O | X | X | X | X | X | O | O | O | O | O | O | 90 TIMES |

60 TIMES    10 TIMES

(52) U.S. Cl.
CPC ............... *G06F 2221/2109* (2013.01); *G06F 2221/2141* (2013.01)

(58) Field of Classification Search
USPC .......................................... 463/29
See application file for complete search history.

(56) References Cited

U.S. PATENT DOCUMENTS

| | | | | |
|---|---|---|---|---|
| 2015/0371499 | A1* | 12/2015 | Sansregret | G07F 17/3244 463/25 |
| 2018/0204201 | A1* | 7/2018 | Cheek | G06Q 20/405 |
| 2019/0188967 | A1* | 6/2019 | Giuffria | G07F 17/3295 |

FOREIGN PATENT DOCUMENTS

| | | | |
|---|---|---|---|
| JP | 2019005539 | A | 1/2019 |
| JP | 2019017674 | A | 2/2019 |
| JP | 2020103840 | A | 7/2020 |

OTHER PUBLICATIONS

[Monster Hunter World] What is a login bonus? Available item summary Mar. 8, 2019 <https://game8.jp/mhw/192990> (6 pages).
"Phantom of the kill" is a 4th anniversary commemorative distribution of "4 years of login bonus". Ohshima, Yuko is appointed Nov. 8, 2018 <https://www.4gamer.net/games/270/G027096/20181108044/> (13 pages).
Tips—Phantom of the kill—cheat Wiki* Jan. 29, 2015 <https://wikiwiki.jp/punk/???/Tips> (3 pages).
Office Action issued in Japanese Application No. 2019-086661; dated Dec. 24, 2019 (5 pages).
Office Action issued in Japanese Application No. 2019-086661; dated Jul. 30, 2019 (6 pages).
Office Action issued in Japanese Application No. 2019-060894; dated Sep. 1, 2020 (6 pages).
International Search Report issued in International Application No. PCT/JP2020/015947, dated Jun. 2, 2020 (7 pages).
Written Opinion issued in International Application No. PCT/JP2020/015947; dated Jun. 2, 2020 (4 pages).

* cited by examiner

| | PARTICULAR TIME FRAME (DAYS) | | | | | | | | | | | | | | TOTAL |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | |
| PATTERN A | ○ | ○ | ○ | ○ | ○ | ○ | ○ | ○ | ○ | ○ | ○ | ○ | ○ | ○ | 140 TIMES |
| PATTERN B | × | × | × | × | × | ○ | ○ | ○ | ○ | ○ | ○ | ○ | ○ | ○ | 140 TIMES |
| PATTERN C | ○ | ○ | ○ | × | × | × | × | × | ○ | ○ | ○ | ○ | ○ | ○ | 90 TIMES |

60 TIMES   10 TIMES

FIG.7A

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2020/015947, filed on Apr. 9, 2020, which claims priority to Japanese Patent Application No. 2019-086661, filed on Apr. 26, 2019, the entire contents of which are incorporated by reference herein.

BACKGROUND ART

Technical Field

The present invention relates to information processing programs, information processing methods, and information processing systems.

In conventional game systems, rewards, such as items and characters, can be earned by lottery, the so-called gacha. In such game systems, when a player performs a login every certain time period in a particular time frame, the player is granted the right to play the gacha as a login bonus and is thus encouraged to perform a login (for example, refer to PTL

CITATION LIST

Patent Literature

Patent Literature 1: JP 2019-5539 A

SUMMARY OF INVENTION

Technical Problem

However, when the player performs a login for the first time at an intermediate point in the particular time frame, the player cannot receive login bonuses that were granted in the certain time periods before the first login, which may possibly result in a sense of loss.

An object of the present invention is to provide an information processing program, an information processing method, and an information processing system capable of decreasing the sense of loss of a player.

Solution to Problem

In order to solve the above-described problem, an information processing program causes a computer to function as: an information management unit for storing login information when a login is performed for the first time in a particular time frame; and a right-granting unit that grants a right when a login is performed every certain time period in the particular time frame and that, in the case where the login information is not stored and the certain time period in which the right is not granted has elapsed when a login is performed in the particular time frame, grants the right on the basis of the certain time period in which the right is not granted.

The login information may include information about the time at which a login is performed for the first time in the particular time frame, and the right-granting unit, in the case where the login information is not stored when a login is performed, may determine the number of rights to be granted on the basis of the difference between the time of the start of the particular time frame and the time at which the login is performed.

In the case where the login information is stored and the certain time period in which the right is not granted has elapsed, the right-granting unit, even when a login is performed again in the particular time frame, need not grant the right for the certain time period that has passed without a login being performed.

An extended time frame may be provided after the particular time frame, and the right-granting unit, in the case where no login is performed in the particular time frame and a login is performed in the extended time frame, may grant all of the rights that are granted in the particular time frame.

In order to solve the above-described problem, an information processing method includes: storing login information when a login is performed for the first time in a particular time frame; and granting a right when a login is performed every certain time period in the particular time frame and, in the case where the login information is not stored and the certain time period in which the right is not granted has elapsed when a login is performed in the particular time frame, granting the right on the basis of the certain time period in which the right is not granted.

In order to solve the above-described problem, an information processing system includes: an information management unit for storing login information when a login is performed for the first time in a particular time frame; and a right-granting unit that grants a right when a login is performed every certain time period in the particular time frame and that, in the case where the login information is not stored and the certain time period in which the right is not granted has elapsed when a login is performed in the particular time frame, grants the right on the basis of the certain time period in which the right is not granted.

Effects of Disclosure

According to the present invention, a sense of loss of a player can be decreased.

BRIEF DESCRIPTION OF DRAWINGS

FIG. 7A is a diagram for illustrating 10 consecutive reward lotteries in a particular time frame.

DESCRIPTION OF EMBODIMENTS

One aspect of an embodiment of the present invention will now be described in detail with reference to the accompanying drawings. The dimensions, materials, other specific values, etc. given in this embodiment are merely examples for facilitating understanding, and do not limit the present invention unless otherwise specifically mentioned. In the present description and the drawings, elements having substantially the same functions and configurations have the same reference signs attached thereto and are not described repeatedly, and elements that are not directly relevant to the present invention are not shown.

(Overall Configuration of Information Processing System S)

Figure 1:
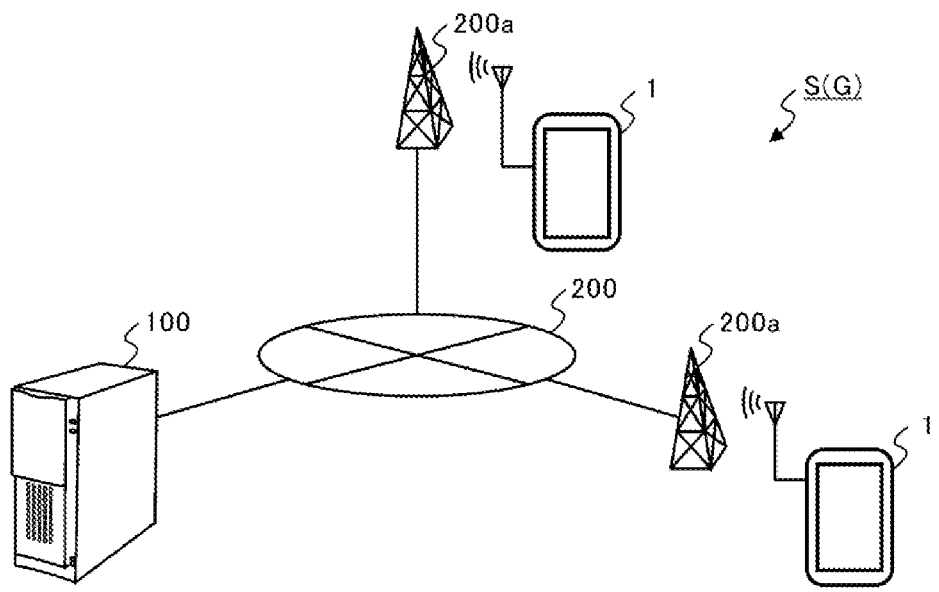
FIG. 1 is an illustration showing a schematic configuration of an information processing system.

FIG. 1 is an illustration showing a schematic configuration of an information processing system S. The information processing system S is a so-called client server system, including player terminals 1, a server 100, and a communication network 200 having communication base stations 200a.

Each of the player terminals 1 can establish communication with the server 100 via the communication network 200. The player terminal 1 widely includes electronic devices capable of communicatively connecting to the server 100 in a wireless or wired manner. Examples of the player terminal 1 include smartphones, mobile phones, tablet devices, personal computers, game devices, etc. This embodiment will be described by way of an example where a smartphone is used as the player terminal 1.

The server 100 is communicatively connected to a plurality of the player terminals 1. The server 100 accumulates various types of information (player information) for each player ID for identifying a player who plays a game.

The communication base stations 200a are connected to the communication network 200 and wirelessly transmit and receive information to and from the player terminals 1. The communication network 200 is configured of a mobile phone network, the Internet, a LAN (Local Area Network), a dedicated line, etc. and achieves a wireless or wired communicative connection between the player terminals 1 and the server 100.

In the information processing system S according to this embodiment, each of the player terminals 1 and the server 100 function as game devices G. The player terminal 1 and the server 100 individually have assigned thereto roles for controlling the progress of the game such that it is possible to proceed with the game through cooperation between the player terminal 1 and the server 100.

(Hardware Configuration of Player Terminal 1 and Server 100)

Figure 2A:
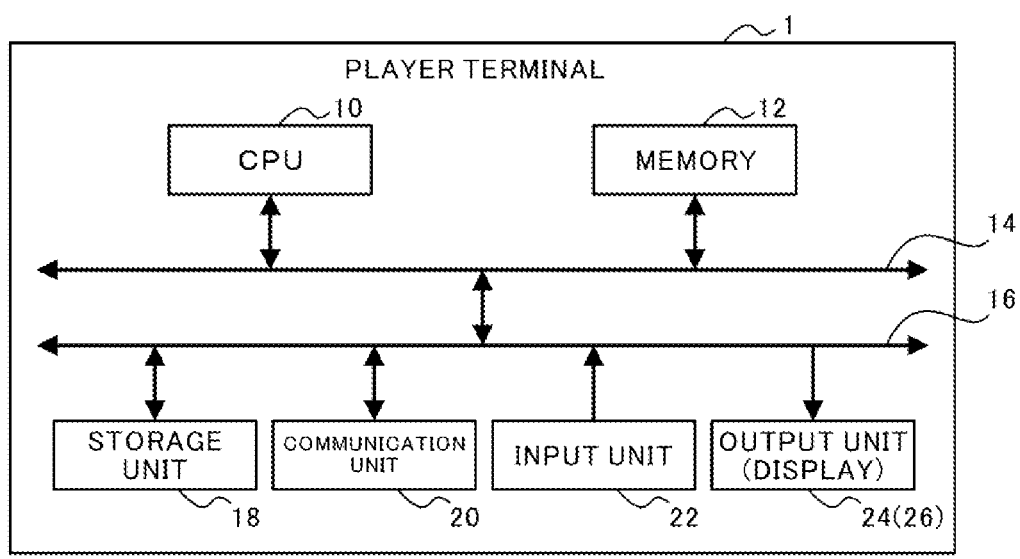
FIG. 2A is a diagram for illustrating the hardware configuration of a player terminal.
Figure 2B:
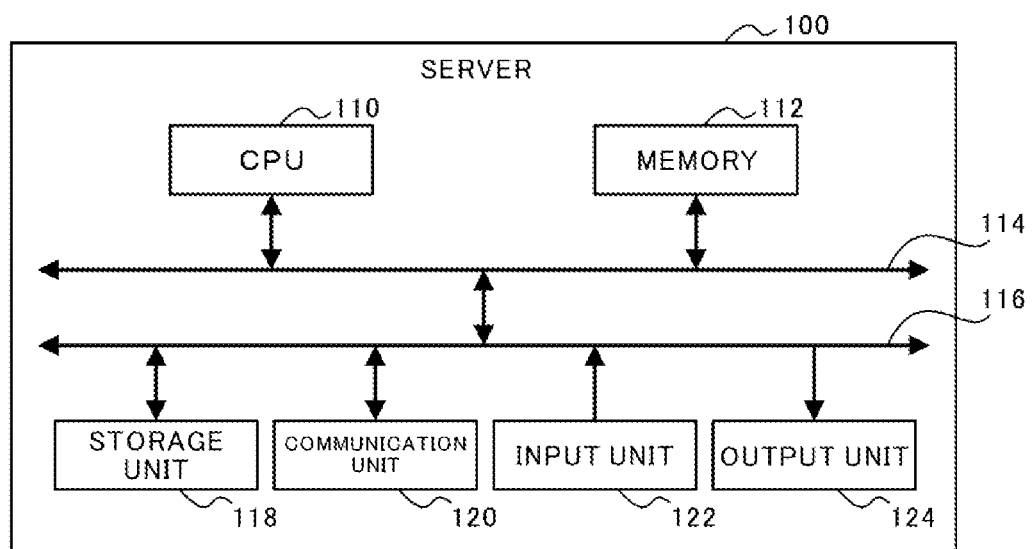
FIG. 2B is a diagram for illustrating the hardware configuration of a server.

FIG. 2A is a diagram for illustrating the hardware configuration of the player terminal 1. Furthermore, FIG. 2B is a diagram for illustrating the hardware configuration of the server 100. As shown in FIG. 2A, the player terminal 1 is configured to include a CPU (Central Processing Unit) 10, a memory 12, a bus 14, an input/output interface 16, a storage unit 18, a communication unit 20, an input unit 22, and an output unit 24.

In addition, as shown in FIG. 2B, the server 100 is configured to include a CPU 110, a memory 112, a bus 114, an input/output interface 116, a storage unit 118, a communication unit 120, an input unit 122, and an output unit 124.

Note that the configurations and the functions of the CPU 110, the memory 112, the bus 114, the input/output interface 116, the storage unit 118, the communication unit 120, the input unit 122, and the output unit 124 of the server 100 are substantively identical to those of the CPU 10, the memory 12, the bus 14, the input/output interface 16, the storage unit 18, the communication unit 20, the input unit 22, and the output unit 24, respectively, of the player terminal 1. Therefore, hereinafter, the hardware configuration of the player terminal 1 will be described, and the descriptions of the server 100 are omitted.

The CPU 10 runs programs stored in the memory 12 and controls the progress of a game. The memory 12 is configured of a ROM (Read Only Memory) or a RAM (Random Access Memory) and stores programs and various types of data required to control the progress of the game. The memory 12 is connected to the CPU 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a DRAM (Dynamic Random Access Memory), and stores various types of programs and data. In the player terminal 1, programs and data stored in the storage unit 18 are loaded into the memory 12 (RAM) by the CPU 10.

The communication unit 20 is communicatively connected to the communication base station 200a in a wireless manner and transmits and receives information, such as various types of data and programs, to and from the server 100 via the communication network 200. In the player terminal 1, programs, etc. received from the server 100 are stored in the memory 12 or the storage unit 18.

The input unit 22 is configured of, for example, a touchscreen, buttons, a keyboard, a mouse, arrow keys, an analog controller, or the like with which player operations are input (operations are accepted). Alternatively, the input unit 22 may be a dedicated controller that is provided in the player terminal 1 or connected (externally attached) to the player terminal 1. Alternatively, the input unit 22 may be configured of an acceleration sensor for detecting the inclination and movement of the player terminal 1 or a microphone for detecting the player's speech. In short, the input unit 22 widely includes devices that allow the player to input his/her intents thereto in distinguishable manners.

The output unit 24 is configured to include a display device and a speaker. Note that the output unit 24 may be a device connected (externally attached) to the player terminal 1. In this embodiment, the player terminal 1 includes a display 26 as the output unit 24 and includes, as the input unit 22, a touchscreen provided so as to overlay the display 26.

(Details of Game)

Next, details of a game provided by the information processing system S (game device G) according to this embodiment will be described by way of an example. This embodiment provides a so-called battle game in which ally characters combat with enemy characters. More specifically, a plurality of ally characters are provided in the game of this embodiment. The player selects a plurality of (five here) ally characters from among the provided ally characters and plays a plurality of types of battle games with different enemy characters and difficulty levels. In this battle game, a reward can be earned when ally characters beat the enemy characters (clear the battle game).

Figure 3A:
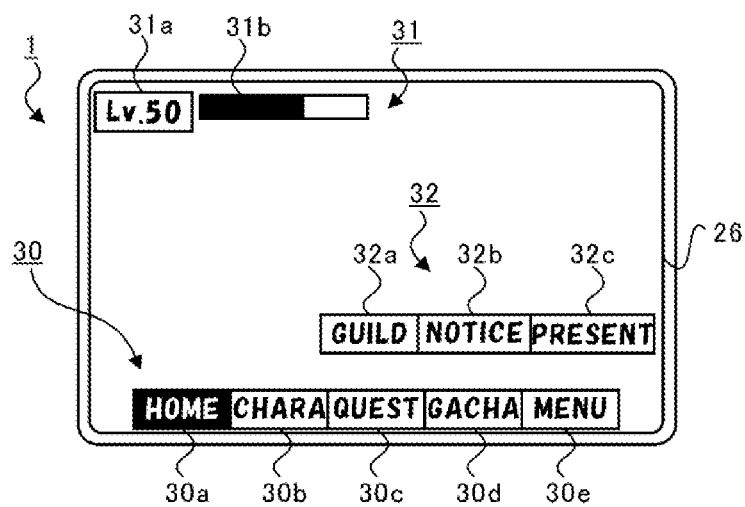
FIG. 3A is a diagram showing an example of a home screen.
Figure 3B:
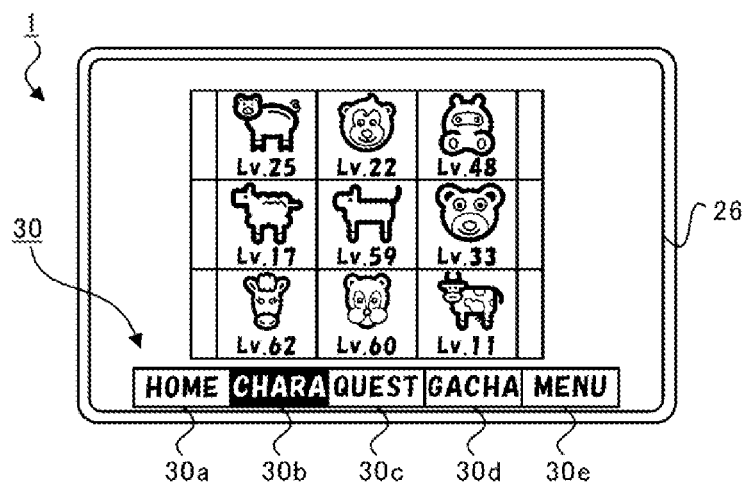
FIG. 3B is a diagram for illustrating an example of an ally character confirmation screen.
Figure 3C:
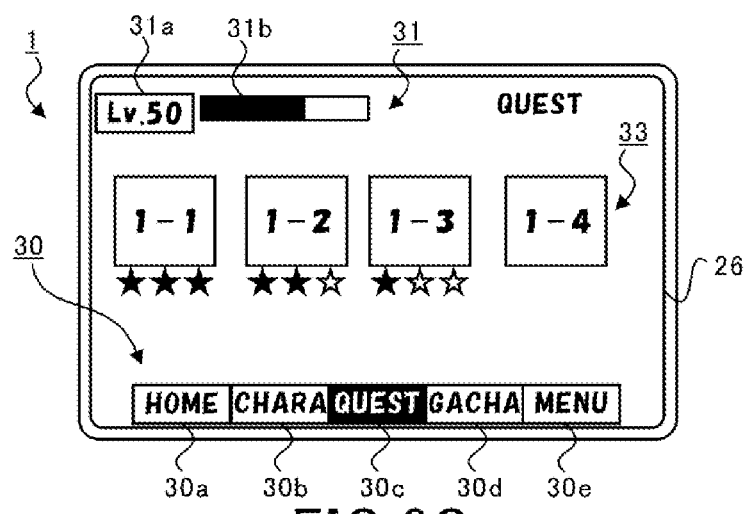
FIG. 3C is a diagram showing an example of a quest screen.

FIG. 3A is a diagram showing an example of a home screen. FIG. 3B is a diagram for illustrating an example of an ally character confirmation screen. FIG. 3C is a diagram showing an example of a quest screen. Game screens as shown in FIGS. 3A, 3B, and 3C are displayed on the display 26 of the player terminal 1. In this embodiment, the game screens are roughly classified into normal screens and a battle screen.

The normal screens are screens on which the player mainly performs various types of settings and confirms information. On the other hand, the battle screen is a screen displayed on the display 26 from the start to the end of the battle game. Here, all screens other than the battle screen are normal screens. The normal screens are roughly classified into five screens: the home screen shown in FIG. 3A, the ally character confirmation screen shown in FIG. 3B, the quest screen shown in FIG. 3C, a gacha screen (refer to FIG. 6A), and a menu screen (not shown in the figure).

On each of the normal screens, a menu bar 30 is displayed in the lower section of the display 26. A plurality of operation sections that can be operated (tapped) by the player are provided in the menu bar 30. A home-screen selection operation section 30*a* captioned "Home", an ally-character confirmation-screen selection operation section 30*b* captioned "Chara", a quest-screen selection operation section 30*c* captioned "Quest", a gacha-screen selection operation section 30*d* captioned "Gacha", and a menu-screen selection operation section 30*e* captioned "Menu" are provided in the menu bar 30.

When the home-screen selection operation section 30*a* is tapped, the home screen shown in FIG. 3A is displayed on the display 26. In addition, when the ally-character confirmation-screen selection operation section 30*b* is tapped, the ally character confirmation screen shown in FIG. 3B is displayed on the display 26. Similarly, when the quest-screen selection operation section 30*c* is tapped, the quest screen shown in FIG. 3C is displayed on the display 26. In addition, when the gacha-screen selection operation section 30*d* is tapped, the gacha screen (refer to FIG. 6A) is displayed on the display 26. In addition, when the menu-screen selection operation section 30*e* is tapped, the menu screen (not shown in the figure) is displayed on the display 26.

As described above, the normal screens are roughly classified into five screens. In the menu bar 30, the operation section corresponding to each screen is highlighted so that the screen being displayed on the display 26 can be identified.

The home screen shown in FIG. 3A corresponds to an initial screen, and a header display area 31 is provided in the upper section. In the header display area 31, level information 31*a* indicating the level of the player associated with the player ID and a stamina indication bar 31*b* indicating the stamina of the player associated with the player ID are displayed.

Note that the stamina is a parameter required to play the battle game. In this embodiment, a plurality of types of battle games are provided, and each of the battle games has set therein the stamina consumption value required to play the battle game and the maximum number of times per day the battle game can be executed. In the case where the player is to play a battle game in which the stamina consumption value required to play the battle game is set, the player is supposed to play the battle game while consuming stamina, and therefore, the player cannot play the battle game when the stamina is insufficient.

Although not described in detail, the player can earn a predetermined value as a player experience value when the player wins the battle game. Also, each time the player experience value reaches a certain value, the player level increases. The upper limit of stamina is set in the player level, and as the player level increases, the upper limit of stamina also becomes higher. The stamina recovers every certain time period (e.g., every five minutes) by a predetermined value (e.g., one point) within the range defined by the upper limit. On the stamina indication bar 31*b*, the current remaining capacity of stamina with respect to the upper limit of stamina is displayed in such a manner as to be visually recognizable.

In addition, a home menu 32 is displayed above the menu bar 30 on the home screen. In the home menu 32, a guild-screen selection operation section 32*a* captioned "Guild", a notice-screen selection operation section 32*b* captioned "Notice", and a present-screen selection operation section 32*c* captioned "Present" are provided.

When the guild-screen selection operation section 32*a* is tapped, a guild screen (not shown in the figure) is displayed on the display 26. In addition, when the notice-screen selection operation section 32*b* is tapped, a notice screen (not shown in the figure) for displaying update information, maintenance information, etc. is displayed on the display 26. In addition, when the present-screen selection operation section 32*c* is tapped, a present screen (not shown in the figure) for displaying items distributed from, for example, the game administrator is displayed on the display 26.

On the ally character confirmation screen shown in FIG. 3B, all ally characters (images) corresponding to the ally character IDs associated with the player ID are displayed. In other words, on the ally character confirmation screen, all ally characters possessed by the player are displayed. Note that ally character IDs are used to identify ally characters, and different IDs are assigned to different ally characters. Also, when the player earns a new ally character by, for example, a reward lottery or the like (described below in detail), the ally character ID of the earned ally character is associated with the player ID of the player.

For each of the ally characters, an experience value and a level are stored in association therewith. The experience value increases when the player wins the battle game (described later) or uses a predetermined item. The level is set in accordance with the experience value, and the level increases each time the experience value reaches a predetermined value. Note that an upper limit of the level is set in each of the ally characters, and the level increases only within the range defined by the upper limit value.

In addition, base values of battle abilities, including life points, an attacking power, and a defending power, are set in each of the ally characters on the basis of the level. The higher the battle abilities of each of the ally characters is, the more advantageous the player becomes in proceeding with the battle game. In addition, the higher the level, the higher each of the base values set in each of the ally characters.

Furthermore, ally characters can be equipped with items of equipment such as weapons and protectors (ally characters can have items of equipment set thereon). Each of the items of equipment has set therein an additional value to the attacking power, the defending power, etc. When an ally character is equipped with equipment, the additional value of the equipment is added to the above-described base values, making it possible to enhance the battle abilities of the ally character.

On the quest screen shown in FIG. 3C, a plurality of game selection operation sections 33 for selecting respective battle games (hierarchy) are displayed. In the game selection operation sections 33, clearance information for the battle games is displayed together. The clearance information is indicated with, for example, three stars. In a battle game, when that battle game is cleared, stars are earned according to the number of ally characters whose life points are 0 at the time the battle game is cleared. For example, three stars are earned in the case where there are no ally characters whose life points are 0, two stars are earned in the case where there is one ally character whose life points are 0, and one star is earned in the case where there are two or more ally characters whose life points are 0.

In the example of FIG. 3C, three stars are earned for the "1-1" battle game, two stars are earned for the "1-2" battle game, and one star is earned for the "1-3" battle game. In addition, no stars are earned for the "1-4" battle game, indicating that this battle game is not cleared.

Note that in the battle game, when one battle game is cleared, the next battle game is released. Therefore, in the example of FIG. 3C, because the battle games up to the "1-3" battle game are cleared, the "1-4" battle game is released, but the subsequent battle games ("1-5" and after, not shown in the figure) are not released.

Figure 4A:
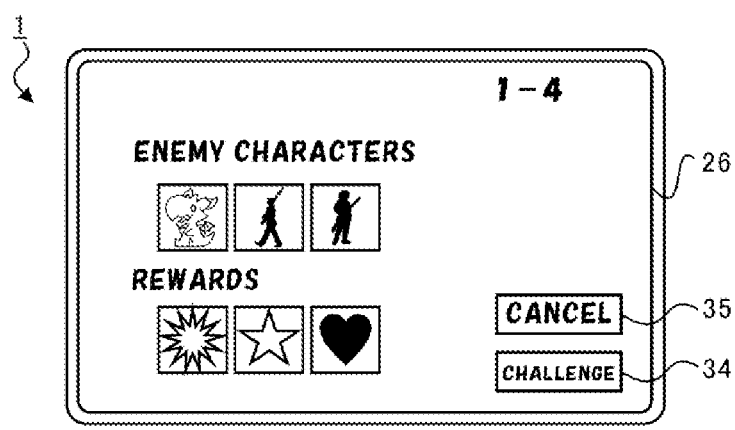
FIG. 4A is a diagram for illustrating an example of a quest selection screen.
Figure 4B:
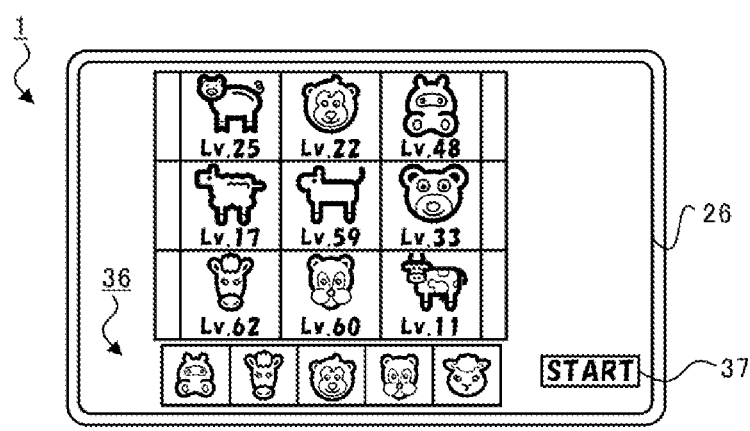
FIG. 4B is a diagram for illustrating an example of a party selection screen.
Figure 5A:
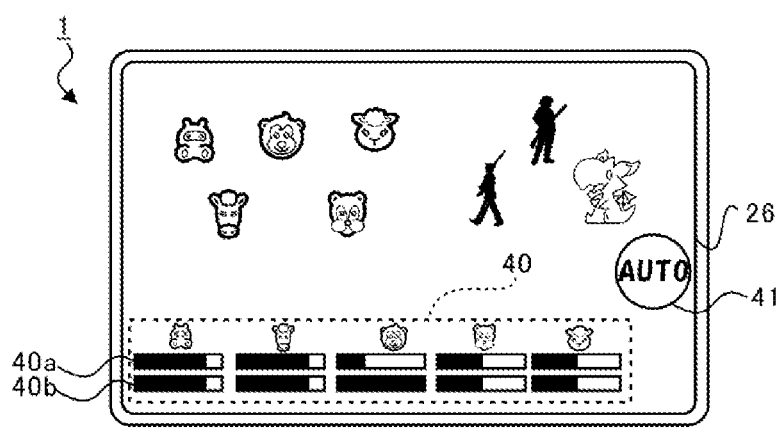
FIG. 5A is a diagram for illustrating an example of a battle screen.
Figure 5B:
FIG. 5B is a diagram for illustrating an example of a result screen.

FIG. 4A is a diagram for illustrating an example of a quest selection screen. FIG. 4B is a diagram for illustrating an example of a party selection screen. FIG. 5A is a diagram for illustrating an example of the battle screen. FIG. 5B is a diagram for illustrating an example of a result screen.

When the game selection operation section 33 for, for example, the "1-4" battle game is tapped on the quest screen, the quest selection screen shown in FIG. 4A is displayed on the display 26. On the quest selection screen, enemy characters who will appear in the battle game and items (rewards) that can be earned in the battle game are displayed. In addition, on the quest selection screen, a challenge selection operation section 34, captioned "Challenge", for the battle game challenge, as well as a cancel selection operation section 35, captioned "Cancel", for cancelling the battle game challenge, are displayed.

When the cancel selection operation section 35 is tapped, the quest screen shown in FIG. 3C is displayed on the display 26, and challenge to the selected "1-4" battle game is cancelled.

On the other hand, when the challenge selection operation section 34 is tapped, the party selection screen shown in FIG. 4B is displayed on the display 26. On the party selection screen, all ally characters possessed by the player are displayed, and, below the ally characters, a selected-ally-character display area 36 for displaying the selected ally characters is displayed.

On the party selection screen, when the player taps a displayed ally character, the selected ally character is displayed in the selected-ally-character display area 36. In other words, here, ally character IDs to be used in the battle game are selected from among the plurality of ally character IDs associated with the player ID.

Then, when ally characters (ally character IDs) are selected and a start operation section 37 is tapped, the battle game starts.

During the battle game, the battle screen, as shown in FIG. 5A, is displayed on the display 26. On the battle screen, ally characters and enemy characters are displayed. The ally characters are operated via computer control, inflicting damage on the enemy characters and suffering damage from the enemy characters. In addition, the enemy characters are operated via computer control, inflicting damage on the ally characters and suffering damage from the ally characters.

When an enemy character is given damage points, the damage points are subtracted from the life points of the enemy character. Similarly, when an ally character is given damage points, the damage points are subtracted from the life points of the ally character. When the life points of all enemy characters become 0, the player wins the battle game (clears the battle game), and when the life points of all ally characters become 0 (loses the battle game), the player loses the battle game.

Here, in the lower section of the battle screen, an ally character display area 40 is provided, as shown in FIG. 5A. In the ally character display area 40, life points 40$a$ and a killer technique gauge 40$b$ for each of the ally characters are displayed. The killer technique gauge 40$b$ increases when the ally character suffers damage from an enemy character or an enemy character is given damage. Also, when the killer technique gauge 40$b$ reaches a prescribed maximum value, that ally character becomes able to use the killer technique. The killer technique gives more damage points to an enemy character than a normal attack.

Here, there are two patterns of methods for using the killer technique. In one of the patterns, the player taps an ally character whose killer technique gauge 40$b$, displayed in the ally character display area 40, has reached the maximum value. In the other pattern, when the killer technique gauge 40$b$ reaches the maximum value in an auto state, the ally character uses the killer technique via computer control. Note that an auto selection operation section 41 is displayed on the battle screen, so that the player can switch between the auto state and a manual state by tapping the auto selection operation section 41. When the auto selection operation section 41 is tapped in the manual state, the auto state in which the killer technique is used automatically is entered. In addition, when the auto selection operation section 41 is tapped in the auto state, the manual state in which the killer technique is used manually is entered. Note that, even in the auto state, the player can also use the killer technique when the player operates (taps) an ally character in a state in which the killer technique gauge 40$b$ reaches the maximum value and the killer technique is not used via computer control.

Then, when the battle game normally ends, the result screen is displayed on the display 26, as shown in FIG. 5B. FIG. 5B shows a result screen, as an example, in the case where the ally characters have won. On the result screen, an end operation section 42, captioned "Close", for closing the result screen is displayed, together with at least some of the game result information items of the battle game.

Note that the game result information includes: the ally character IDs (party) of ally characters; the enemy character IDs of enemy characters; remaining conditions of the ally characters and the enemy characters at the time the battle ended (whether or not the life points were 0 at the time the battle game ended); given damage points (total value); battle log ID; and information associated with each battle game (clearance information, hierarchy of the battle game, etc.).

When the end operation section 42 is tapped on the result screen, the display on the display 26 switches from the battle screen to a normal screen. In short, the result screen is a portion of the battle screen. Note that the normal screen switched over from the result screen may be the screen displayed just before the battle screen is switched over thereto or may be a predetermined screen, such as the home screen. In this manner, the battle game ends as the display of the result screen ends.

Figure 6A:
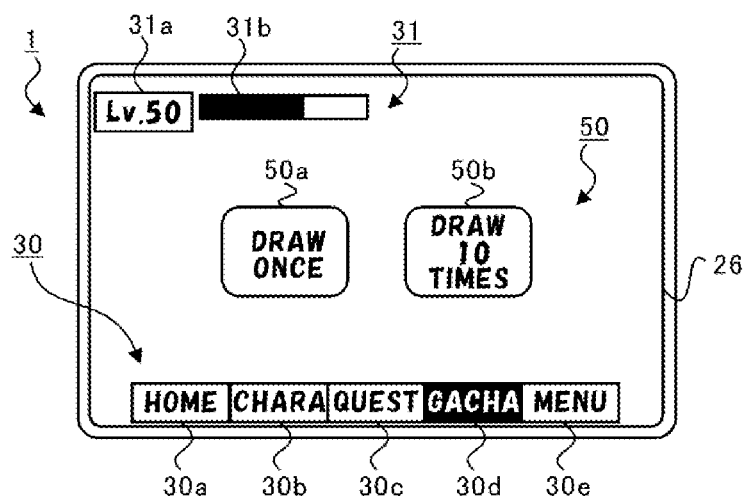
FIG. 6A is a diagram showing an example of a gacha screen.
Figure 6B:
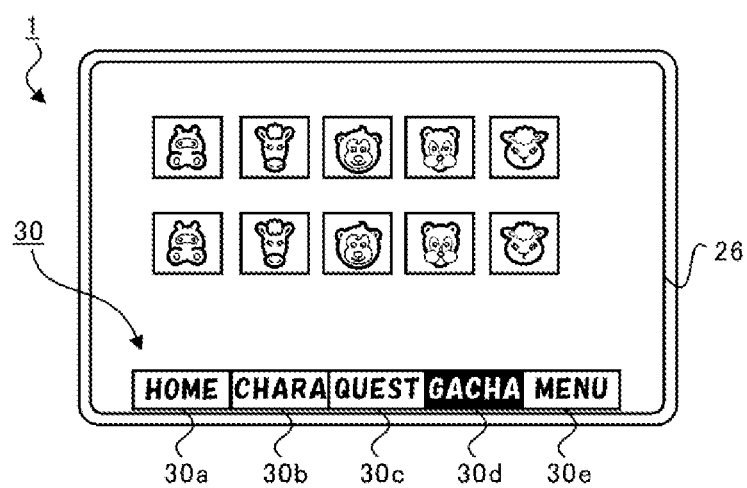
FIG. 6B is a diagram showing an example of a gacha result screen.

FIG. 6A is a diagram showing an example of the gacha screen. FIG. 6B is a diagram showing an example of a gacha result screen. When the gacha-screen selection operation section 30d (refer to FIG. 3A) is tapped, the gacha screen shown in FIG. 6A is displayed. On the gacha screen, a one-time-lottery operation section 50a and a 10-consecutive-lottery operation section 50b are displayed. Note that, hereinafter, the one-time-lottery operation section 50a and the 10-consecutive-lottery operation section 50b are collectively referred to as the lottery operation section 50. When the lottery operation section 50 is tapped, a lottery (hereinafter referred to as "reward lottery") for determining an ally character (reward) to be bestowed on the player is executed.

When the one-time-lottery operation section 50a is tapped, the reward lottery is executed once. When the 10-consecutive-lottery operation section 50b is tapped, the reward lottery is executed ten times (hereinafter, referred to as the "10 consecutive reward lotteries"). In short, in the 10 consecutive reward lotteries, the reward lottery is executed ten times as one set. In the reward lottery, one character is definitely determined. Therefore, the player can earn ten ally characters from the 10 consecutive reward lotteries. The results of the 10 consecutive reward lotteries, i.e., the ten ally characters bestowed on the player, are displayed on a lottery result screen, as shown in FIG. 6B.

Note that, in the reward lottery, the winning probability of each of the plurality of types of ally characters is preset. The ally characters are roughly classified into three types: "S rare", "rare", and "common" according to the winning probability thereof. Here, the winning probability of "S rare" is lowest, and the winning probability becomes higher in the order of "rare" and "common". In addition, in the 10 consecutive reward lotteries according to this embodiment, the winning rates of the ally characters are set to be equal for the first to ninth reward lotteries, and the winning probability of "rare" is set to be higher for the tenth session of the reward lottery than for the other sessions of the reward lotteries. It should be noted, however, that in each of the ten sessions of the reward lotteries, the winning rates of all ally characters may be the same or may differ from one another.

Note that when the one-time-lottery operation section 50a or the 10-consecutive-lottery operation section 50b is tapped, the above-described reward lottery is executed by consuming, for example, in-game currency or lottery items. In-game currency and lottery items can be earned, for example, by purchase, by satisfying earning conditions as a result of a game being played, etc. Here, the player can always buy in-game currency. Therefore, the player can always execute the above-described reward lottery by tapping the one-time-lottery operation section 50a or the 10-consecutive-lottery operation section 50b.

In addition, in the reward lottery, ally characters that have already been earned by the player may be determined in some cases. In such cases, items that can be used in the game are bestowed on the player, in place of the ally characters determined in the reward lottery.

Figure 7B:
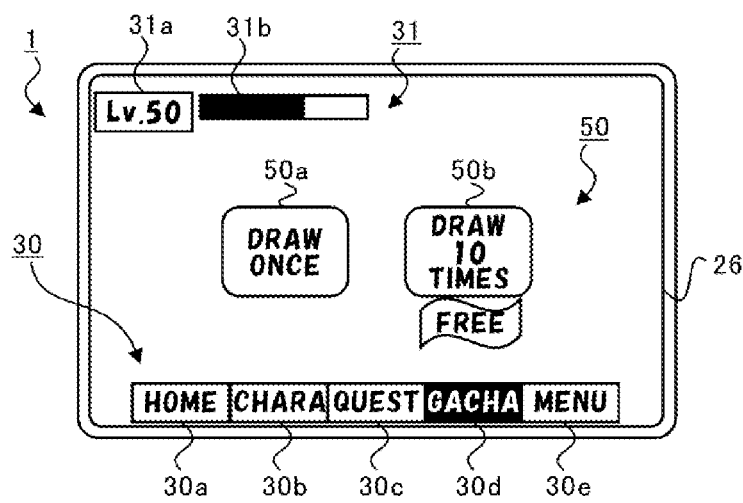
FIG. 7B is a diagram for illustrating a gacha screen in the particular time frame.
Figure 7C:
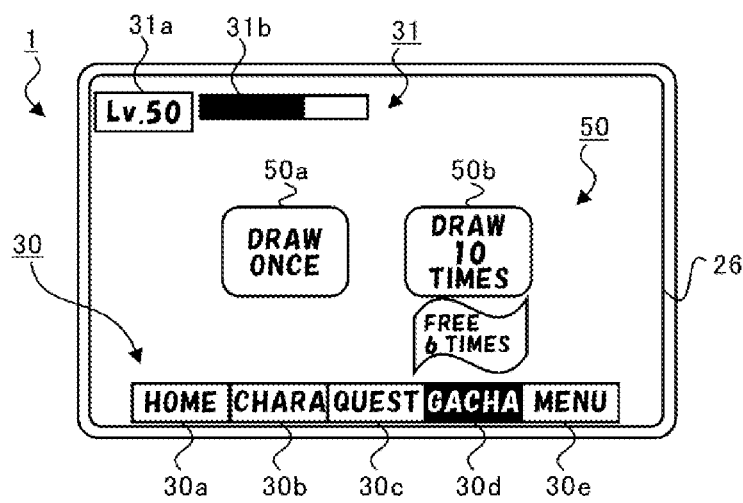
FIG. 7C is a diagram for illustrating a gacha screen in the case where a login is performed for the first time at an intermediate point in the particular time frame.

FIG. 7A is a diagram for illustrating the 10 consecutive reward lotteries in a particular time frame. FIG. 7B is a diagram for illustrating the gacha screen in the particular time frame. FIG. 7C is a diagram for illustrating the gacha screen in the case where a login is performed for the first time at an intermediate point in the particular time frame. Note that, in FIG. 7A, "○" indicates that a login was performed, and "x" indicates no login was performed.

In the information processing system S, when the player logs into the game every certain time period in the particular time frame, the player is granted the right to execute the 10 consecutive reward lotteries as a campaign. The right granted here is the right to allow the player to execute the 10 consecutive reward lotteries without consuming in-game currency or a lottery item (for free). Note that, hereinafter, the right to execute the 10 consecutive reward lotteries is referred to just as "right".

As shown in FIG. 7A, in the case where, for example, a predetermined period of 14 days (two weeks) is set as the particular time frame and the player performs a login, for example, every day (e.g., 5:00 to 4:59 on the following day) as the certain time period, one right is granted per day. Therefore, as shown in pattern A in FIG. 7A, when the player performs a login every day in the particular time frame, a total of 14 rights are granted (the right to execute the reward lottery a total of 140 times is granted).

In the case where the right is granted, tapping the gacha-screen selection operation section 30d causes the gacha screen shown in FIG. 7B to be displayed. On this gacha screen, a message captioned "Free" is displayed in the vicinity of the 10-consecutive-lottery operation section 50b. Because of this, the player is notified that he/she can execute the 10 consecutive reward lotteries for free. Thereafter, when the 10-consecutive-lottery operation section 50b is tapped, the 10 consecutive reward lotteries are executed without having to consume in-game currency and a lottery item (for free).

Note that when the certain time period (4:59 on the following day) elapses without the player executing the 10 consecutive reward lotteries after the player has been granted the right as a result of performing a login in the particular time frame, the granted right disappears.

Now, when the game is started at an intermediate point in the particular time frame, there are days on which the right is not granted from the start of the particular time frame to the start of the game. Also, when the game is restarted (the player comes back) at an intermediate point in the particular time frame, there are days on which the right is not granted. Thus, if the player is not granted the right at all from the start of the particular time frame to the start of the game (in the case where there are rights for every certain time period that are not granted), the player will have a sense of loss.

In light of this, when a login is performed for the first time on, for example, the sixth day after the start of the particular time frame, as shown in pattern B of FIG. 7A, all rights for the number of days (six days), from the start of the particular time frame to the day of the first login, are granted at once in this embodiment. In short, in this example, when a login is performed for the first time, the rights to execute the 10 consecutive reward lotteries for the six days are granted all at once. In other words, when a login is performed for the first time, six rights to execute the 10 consecutive reward lotteries are granted (the right to execute the reward lottery 60 times is granted).

In this case, when the gacha-screen selection operation section 30*d* is tapped, the gacha screen shown in FIG. 7C is displayed on the display 26. On this gacha screen, a message captioned "Free 6 times" is displayed in the vicinity of the 10-consecutive-lottery operation section 50*b*. Because of this, the player is notified that he/she can execute the 10 consecutive reward lotteries six times for free. Then, when the 10-consecutive-lottery operation section 50*b* is tapped, the first session of the 10 consecutive reward lotteries is executed for free. Thereafter, each time the 10-consecutive-lottery operation section 50*b* is tapped, the 10 consecutive reward lotteries are executed for free five times.

In this manner, when a login is performed for the first time in the particular time frame, the rights that were not granted before that day (the rights based on the number of days that have elapsed without the right being granted) are granted all at once. By doing so, players, even when starting the game at an intermediate point in the particular time frame, can be granted the right equivalent to that granted to players who started playing the game from the start of the particular time frame. This reduces a sense of loss perceived by players who start the game at an intermediate point in the particular time frame.

On the other hand, even in the case where a login is performed once in the particular time frame but no login is performed on later days, the rights for the days on which no login is performed (days that have elapsed without the right being granted) are not granted when a login is performed again thereafter. For example, it is assumed that a login is performed from the first to third days, as shown in pattern C in FIG. 7A, with the right being granted each day. No login is performed thereafter from the fourth to eighth days. In such a case, even when a login is performed on the ninth day, the right for the fourth to eighth days, i.e., the right that should have been granted if a login had been performed, is not granted, but the right for the ninth day only is granted. Therefore, in the case of pattern C, even when a login is performed every day on and after the ninth day, the right to execute the 10 consecutive reward lotteries only for nine days is granted (the right to execute the reward lottery 90 times is granted).

By doing so, after the player performs a login for the first time in the particular time frame, the player is motivated to perform a login every day and encouraged to positively participate in the game.

Figure 8:
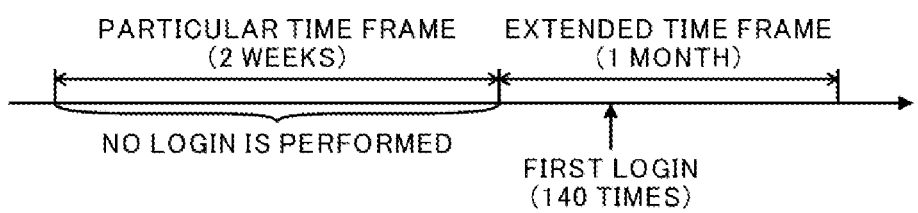
FIG. 8 is a diagram for illustrating an extended time frame.

FIG. 8 is a diagram for illustrating an extended time frame. In this embodiment, an extended time frame is provided after the particular time frame. The extended time frame is set as, for example, one month from the end of the particular time frame. Also, when a login is performed for the first time in the extended time frame in the case where no login is performed in the particular time frame, all rights that are granted in the particular time frame are granted. More specifically, when no login is performed in the particular time frame and a login is performed for the first time in the extended time frame, 14 rights (for 14 days) to execute the 10 consecutive reward lotteries are granted (the right to execute the reward lottery 140 times is granted).

With this extended time frame being provided after the end of the particular time frame, when players perform a login in the extended time frame, even though they start the game after the end of the particular time frame, they are granted all rights that are granted in the particular time frame. This can prevent players who start the game after the end of the particular time frame from having a sense of loss.

Next, communication processes of the player terminal 1 and the server 100 will be described. Note that, here, an example of basic communication processes for proceeding with the game, as well as main communication processes pertaining to the reward lottery during the particular time frame, will be described, and the description of the other processes will be omitted.

(Communication Processes Between Player Terminal 1 and Server 100)

Figure 9:
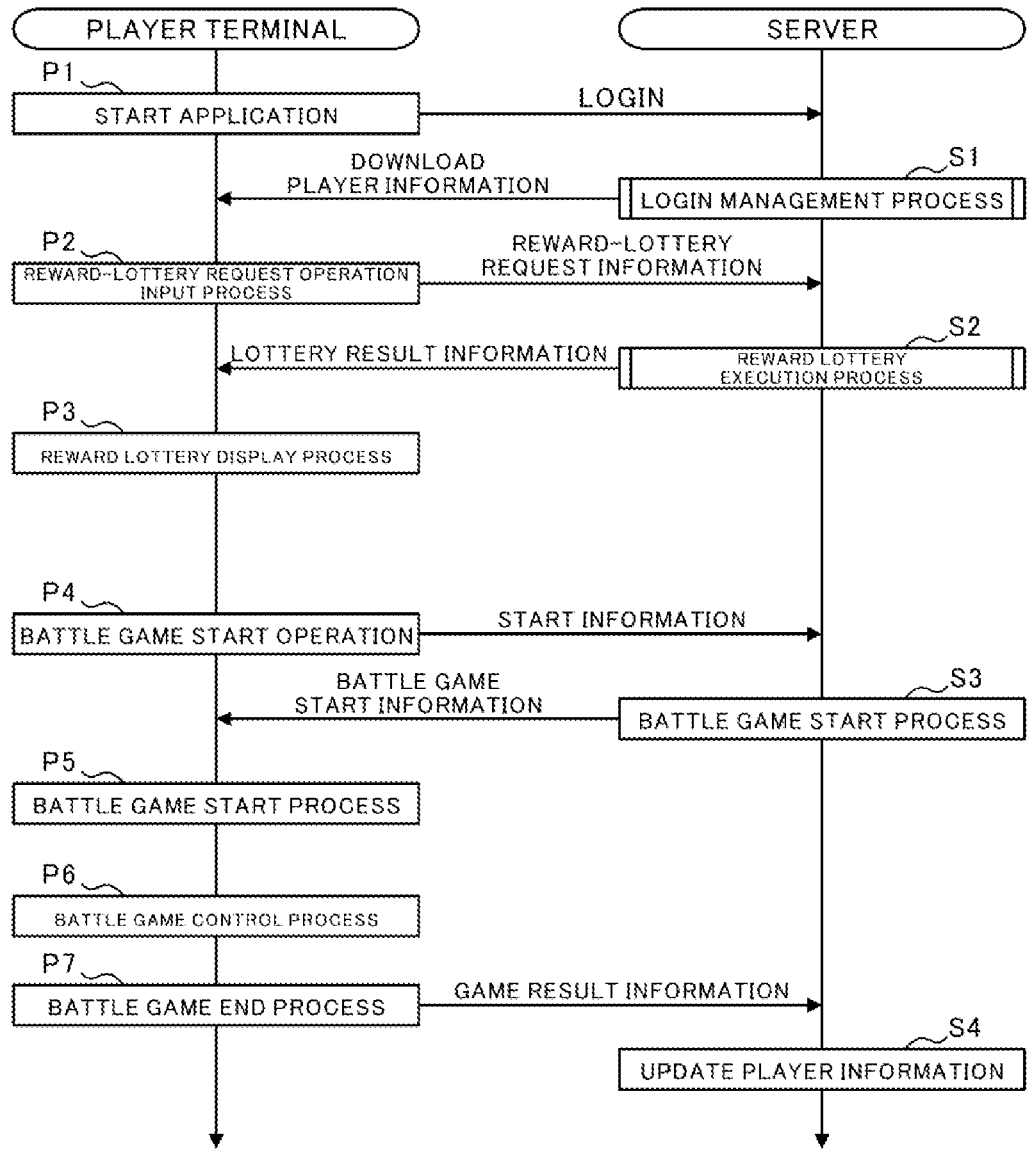
FIG. 9 is a sequence diagram for illustrating basic processes of the player terminal and the server.

FIG. 9 is a sequence diagram for illustrating basic processes of the player terminal 1 and the server 100. Note that, in the following description, processes in the player terminal 1 are denoted as Pn (n is any integer). Furthermore, processes in the server 100 are denoted as Sn (n is any integer). When the player starts the game application on the player terminal 1 (P1), the player terminal 1 transmits information indicating that the player is to log into the server 100. When the server 100 receives information indicating that the player is to log thereinto, the server 100 identifies the player ID associated with the information indicating that the player is to log thereinto and executes a login management process (S1). Here, the server 100 allows the player terminal 1 to download, from the storage unit 118, the player information corresponding to the identified player ID. Note that the player information includes: a plurality of ally character IDs associated with the player ID; game release information indicating whether or not each type of battle games is released, the level of the player; the stamina of the player; in-game currency and lottery items; etc. In addition, in the particular time frame, a login management process regarding the right to execute the 10 consecutive reward lotteries is executed. Note that this login management process will be described in detail later.

When the one-time-lottery operation section 50*a* or the 10-consecutive-lottery operation section 50*b* is tapped on the gacha screen, the player terminal 1 transmits reward-lottery request information (information indicating whether the one-time reward lottery or the 10 consecutive reward lotteries is requested) to the server 100 (P2). When the server 100 receives the reward-lottery request information, the server 100 executes a reward lottery execution process for executing the reward lottery on the basis of the reward-lottery request information (S2). Note that this reward lottery execution process will be described in detail later. Then, the server 100 associates the ally character IDs determined via the reward lottery with the player ID and transmits, to the player terminal 1, lottery result information indicating the lottery result of the reward lottery. When the player terminal 1 receives the lottery result information, the player terminal 1 displays the gacha result screen shown in FIG. 6B on the display 26 (P3).

In addition, it is assumed that the operation for staring the battle game has been performed on the player terminal 1 (P4). In this case, start information is transmitted from the player terminal 1 to the server 100. Note that this start information includes party information, type information of the battle game, etc. selected by the player. As a result of the start information being input thereto, the server 100 transmits, to the player terminal 1, battle game start information required to start the battle game (S3). Then, when the player terminal 1 receives the battle game start information, the player terminal 1 executes a battle game start process for starting the battle game (P5). Here, the player terminal 1, for example, allocates an area in the memory 12 for proceeding with the battle game, reads predetermined programs into the memory 12 from the storage unit 18, etc.

Thereafter, a battle game control process for controlling the battle game is executed in the player terminal (P6). In this battle game control process, an update process for updating various types of information is repeatedly executed frame by frame. Note that the number of frames is not particularly limited. For example, the number of frames per second is 30 to 60. Therefore, during the battle game, information is updated roughly every 16 ms (millisecond) to 33 ms in the player terminal 1.

Then, when the end conditions of the battle game are satisfied, a battle game end process for ending the battle game is executed in the player terminal 1 (P7). In the battle game end process, for example, the result screen is displayed on the display 26, the game result information is transmitted to the server 100, etc. When the server 100 acquires the game result information, the server 100 updates the player information (S4).

(Functional Configuration of Server 100)

Figure 10:
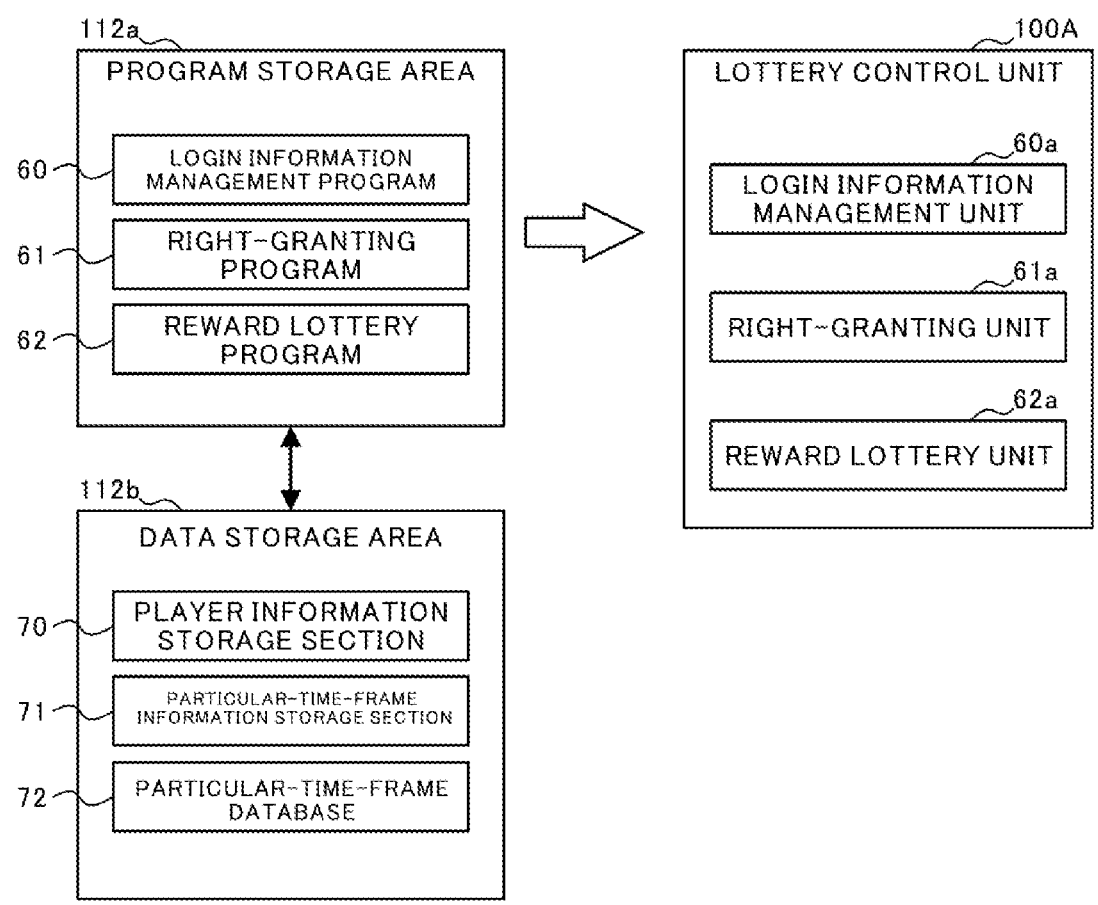
FIG. 10 is a diagram for illustrating the configuration of a memory in the server and functions of the server as a computer.

FIG. 10 is a diagram for illustrating the configuration of the memory 112 in the server 100 and functions of the server 100 as a computer. Here, the configuration of the memory 112 for executing the above-described login management process (S1) and reward lottery execution process (S2), as well as functions of the server 100 as a computer, will be described. The memory 112 includes a program storage area 112a and a data storage area 112b.

The program storage area 112a includes a login information management program 60, a right-granting program 61, and a reward lottery program 62. Note that the programs listed in FIG. 10 are examples, and the server 100 includes many other programs.

The data storage area 112b includes, as memory sections for storing data, a player information storage section 70, a particular-time-frame information storage section 71, and a particular-time-frame database 72. Note that each of the above-described memory sections is an example, and the data storage area 112b includes many other memory sections. The player information storage section 70 stores therein player information for each player ID. In addition, the particular-time-frame information storage section 71 stores, as particular time frame information for each player ID: the type of campaign; the date and time at which a login was performed for the first time in the particular time frame; the date and time at which the 10 consecutive reward lotteries were executed last by using the right (hereinafter, referred to as the "final 10-consecutive-reward-lottery date and time"); and the number of rights granted. In addition, the particular-time-frame database 72 stores, as a database: the type of campaign; the particular time frame, the extended time frame; and the right granted every certain time period in the particular time frame.

The CPU 110 runs each of the programs stored in the program storage area 112a and updates data in each of the memory sections of the data storage area 112b. Also, the CPU 110 allows the server 100 (computer) to function as a lottery control unit 100A by running each of the programs stored in the program storage area 112a. The lottery control unit 100A includes a login information management unit 60a, a right-granting unit 61a, and a reward lottery unit 62a.

More specifically, the CPU 110 runs the login information management program 60 and allows the computer to function as the login information management unit 60a. Similarly, the CPU 110 runs the right-granting program 61 and the reward lottery program 62 and allows the computer to function as the right-granting unit 61a and the reward lottery unit 62a, respectively.

The login information management unit 60a manages logins performed by the player. More specifically, when information indicating that a login is to be performed is transmitted from the player terminal 1, the login information management unit 60a stores, in the particular-time-frame information storage section 71 as login information, the date and time at which a login was performed for the first time in the particular time frame or the extended time frame.

When the player performs a login in the particular time frame, the right-granting unit 61a grants the player the right to execute the 10 consecutive reward lotteries. In addition, the right-granting unit 61a stores, in the particular-time-frame information storage section 71, the number of rights currently held (upper limit number of times the reward lottery can be executed for free).

The reward lottery unit 62a executes the reward lottery on the basis of the reward-lottery request information transmitted from the player terminal 1. Then, the reward lottery unit 62a stores, in the player information storage section 70, the ally character IDs of the ally characters determined by the reward lottery such that the ally character IDs are associated with the player ID. In addition, in the case where the 10 consecutive reward lotteries are executed by using the right, the reward lottery unit 62a subtracts the number of used rights from the number of rights stored in the particular-time-frame information storage section 71.

(Specific Processes of Server 100)

Figure 11:
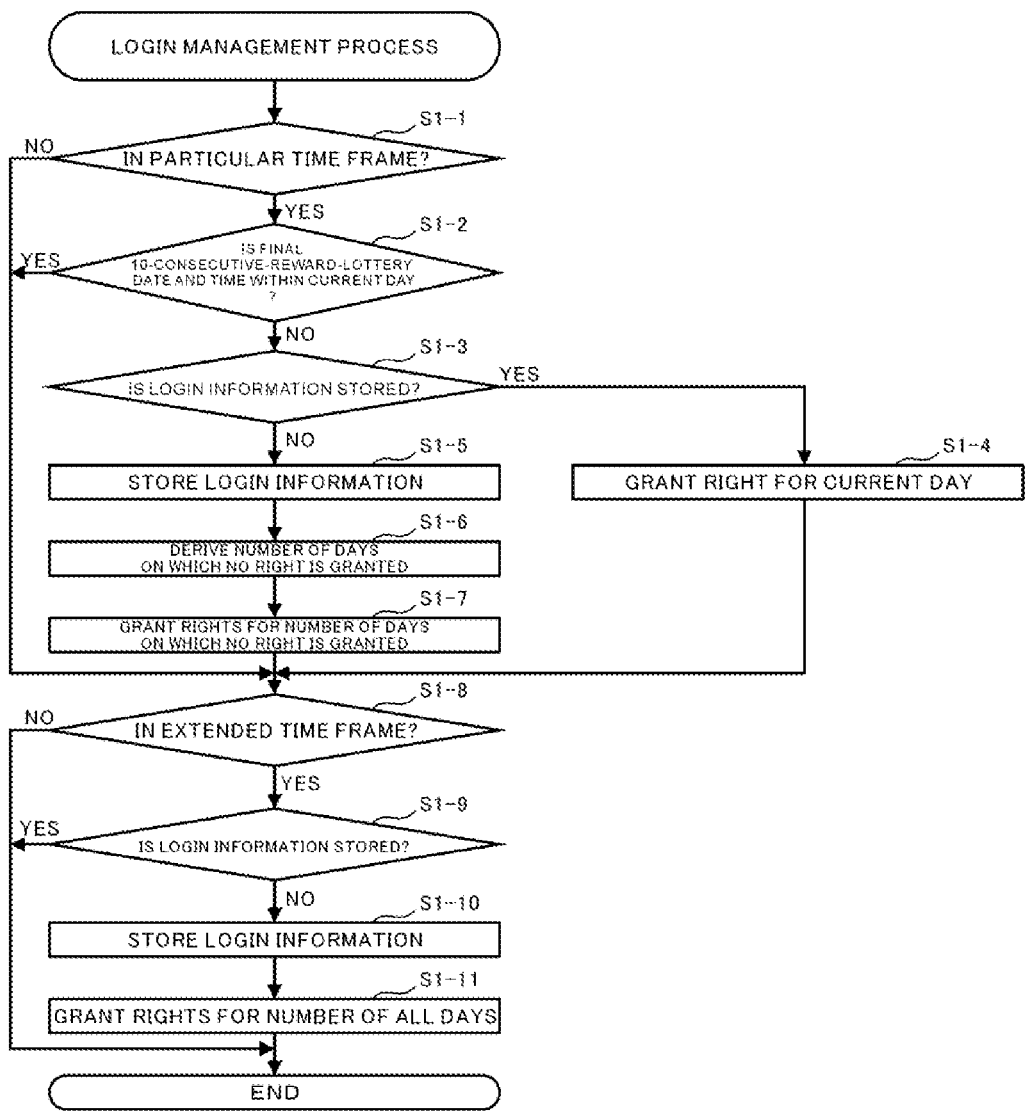
FIG. 11 is a flowchart for illustrating an example of a login management process in the server.

FIG. 11 is a flowchart for illustrating an example of the login management process in the server 100. When the login management process shown in FIG. 11 is started, the login information management unit 60a determines whether or not the current time is within the particular time frame by referring to the particular-time-frame database 72 (S1-1). Also, when the current time is within the particular time frame (YES in S1-1), the login information management unit 60a determines whether or not the final 10-consecutive-reward-lottery date and time is within the current day (from 5:00 to 4:59 on the following day, including the current clock time) by referring to the particular-time-frame information storage section 71 associated with the player ID of the player who has performed the login (S1-2).

If the final 10-consecutive-reward-lottery date and time is within the current day (YES in S1-2), the right granted on the current day is used, and hence the right-granting unit 61a proceeds to the process in S1-8 without granting a new right.

On the other hand, if the final 10-consecutive-reward-lottery date and time are not within the current day (NO in S1-2), the right-granting unit 61a determines whether or not login information is stored in the particular-time-frame information storage section 71 associated with the player ID of the player who has performed the login (S1-3).

If login information is stored (YES in S1-3), the right-granting unit 61a grants the right for the current day (S1-4). More specifically, the right-granting unit 61a stores, in the particular-time-frame information storage section 71, the upper limit number of times (one time) the 10 consecutive reward lotteries can be executed for free. In addition, the right-granting unit 61a transmits, to the player terminal 1, information indicating the upper limit number of times (one time) the 10 consecutive reward lotteries can be executed for free. Note that even in the case where a login is performed multiple times on the same day in the particular time frame, the right-granting unit 61a stores, in the particular-time-frame information storage section 71, the upper limit number of times (one time) the 10 consecutive reward lotteries can be executed for free only when the first login is performed on that day, and the right-granting unit 61a does not store the upper limit number for the second and subsequent logins. In addition, here, the right-granting unit 61a may store, in the particular-time-frame information storage section 71, the upper limit number of times (ten times) the reward lottery can be executed for free, instead of storing, in the particular-time-frame information storage section 71, the upper limit number of times (one time) the 10 consecutive reward lotteries can be executed for free.

If login information is not stored (NO in S1-3), the login information management unit 60a stores the date and time at which the player performed the login, as login information, in the particular-time-frame information storage section 71 associated with the player ID of the player who has performed the login (S1-5).

The right-granting unit 61a derives the number of days on which the right is not granted in the particular time frame by subtracting the date and time of the start of the particular time frame indicated in the particular-time-frame database 72 from the date and time at which a login was performed for the first time in the particular time frame indicated in the login information (by calculating the difference) (S1-6). Then, the right-granting unit 61a grants the right for the derived date and time (S1-7). More specifically, the right-granting unit 61a stores, in the particular-time-frame information storage section 71, the upper limit number of times the 10 consecutive reward lotteries can be executed for free (e.g., six times in the case of the sixth day in pattern B in FIG. 7A). In addition, the right-granting unit 61a transmits, to the player terminal 1, information indicating the upper limit number of times (six times) the 10 consecutive reward lotteries can be executed for free.

The login information management unit 60a determines whether or not the current time is within the extended time frame by referring to the particular-time-frame database 72 (S1-8). If the current time is within the extended time frame (YES in S1-8), the login information management unit 60a determines whether or not login information is stored in the particular-time-frame information storage section 71 associated with the player ID of the player who has performed the login (S1-9). Then, if login information is not stored (NO in S1-9), the login information management unit 60a stores the date and time at which the player performed a login, as login information, in the particular-time-frame information storage section 71 associated with the player ID of the player who has performed the login (S1-10). In addition, the right-granting unit 61a grants the right for the number of all days in the particular time frame (S1-11). More specifically, the right-granting unit 61a stores, in the particular-time-frame information storage section 71, the upper limit number of times (14 times) the 10 consecutive reward lotteries can be executed for free. In addition, the right-granting unit 61a transmits, to the player terminal 1, information indicating the upper limit number of times (14 times) the 10 consecutive reward lotteries can be executed for free. Note that in the case where the certain time period (4:59 on the following day) elapses without the player executing the 10 consecutive reward lotteries after the player has been granted the right as a result of performing a login in the particular time frame, a new upper limit number is stored in the particular-time-frame information storage section 71 in S1-10 when the player performs a new login, and hence, the right for the certain time periods that have elapsed without the player executing the 10 consecutive reward lotteries disappears.

Figure 12:
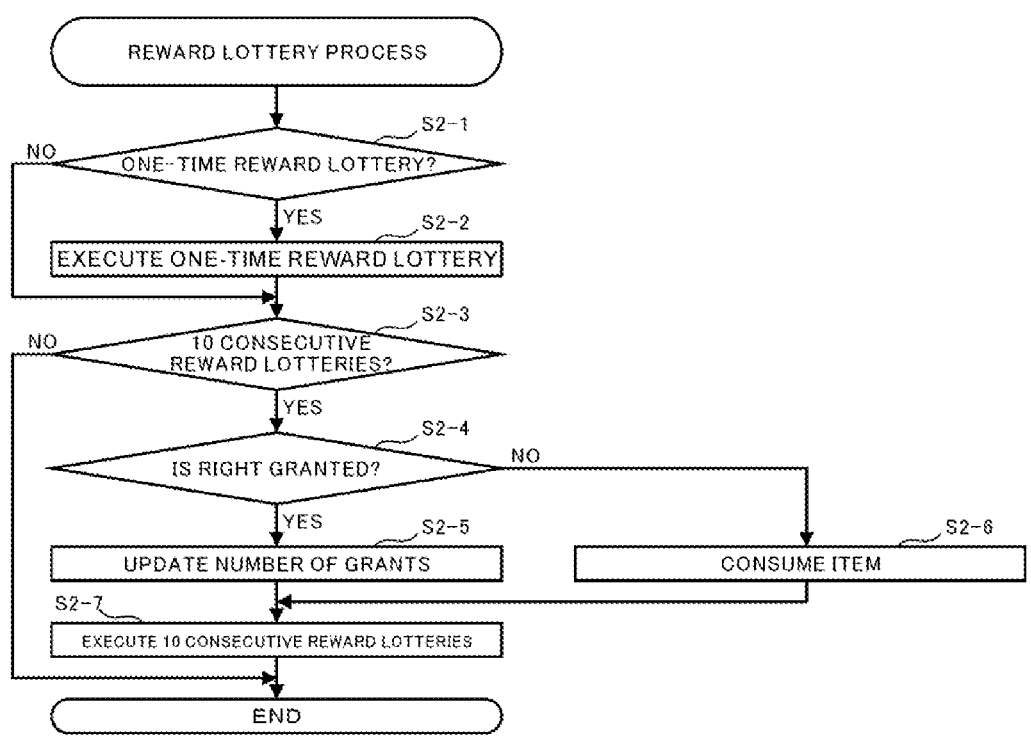
FIG. 12 is a flowchart for illustrating an example of a reward lottery process in the server.

FIG. 12 is a flowchart for illustrating an example of the reward lottery process in the server 100. When the reward lottery process shown in FIG. 12 is started, the reward lottery unit 62a determines whether or not to execute the one-time reward lottery on the basis of the reward-lottery request information transmitted from the player terminal 1 (S2-1). Then, in the case where the one-time reward lottery is executed (YES in S2-1), the reward lottery unit 62a executes the one-time reward lottery by consuming in-game currency and a lottery item stored in the player information storage section 70 (S2-2). The reward lottery unit 62a stores, in the player information storage section 70, the ally character ID of the ally character determined by the reward lottery such that the ally character ID is associated with the player ID.

In addition, the reward lottery unit 62a determines whether or not to execute the 10 consecutive reward lotteries on the basis of the reward-lottery request information transmitted from the player terminal 1 (S2-3). Then, in the case where the 10 consecutive reward lotteries are executed (YES in S2-3), the reward lottery unit 62a determines whether or not the upper limit number of times the reward lottery can be executed for free, stored in the particular-time-frame information storage section 71, is a number other than 0, i.e., whether or not the right is granted (S2-4). Then, in the case where the right is granted (YES in S2-4), the reward lottery unit 62a updates the upper limit number of times the 10 consecutive reward lotteries can be executed for free, stored in the particular-time-frame information storage section 71, by subtracting one from that upper limit number (S2-5) and executes the 10 consecutive reward lotteries (S2-7). The reward lottery unit 62a stores, in the player information storage section 70, the ally character IDs of the ally characters determined by the reward lottery such that the ally character IDs are associated with the player ID.

On the other hand, in the case where the right is not granted (NO in S2-4), the reward lottery unit 62a executes the 10 consecutive reward lotteries (S2-7) by consuming in-game currency and lottery items stored in the player information storage section 70 (S2-6).

As described above, the server 100 includes the login information management program 60, the right-granting program 61, and the reward lottery program 62. In addition, the server 100 includes the login information management unit 60a, the right-granting unit 61a, and the reward lottery unit 62a. However, the player terminal 1 may include some or all of these programs and functional units.

In addition, in the above-described embodiment, when a login is performed for the first time in the particular time frame, the upper limit number of times the 10 consecutive reward lotteries can be executed for free is stored in the particular-time-frame information storage section 71. However, the upper limit number of times the 10 consecutive reward lotteries can be executed for free may be updated each time the certain time period (one day) elapses in the particular time frame. This can be achieved by, for example, incrementing by one the upper limit number of times the 10 consecutive reward lotteries can be executed for free each time the certain time period (one day) elapses.

In addition, in the above-described embodiment, in the case where there is a day on which no login is performed after a login has been performed once in the particular time frame, the right for the day on which no login is performed is not granted even when a login is performed again thereafter. However, the right for a day on which no login is performed may be granted when a login is performed again after that day on which no login is performed.

In addition, in the above-described embodiment, the date and time at which a login is performed for the first time in the particular time frame is stored as login information, so that the number of days for which the right is not granted in the particular time frame is derived by subtracting the date and time of the start of the particular time frame indicated in the particular-time-frame database 72 from the date and time of the first login in the particular time frame. However, a time, such as a date, when a login is performed for the first time in the particular time frame may be stored as login information, so that the number of days for which the right is not granted in the particular time frame may be derived by subtracting the time of the start of the particular time frame indicated in the particular-time-frame database 72 from the time of the first login in the particular time frame.

In addition, in the above-described embodiment, in the case where no login is performed in the particular time frame and a login is performed for the first time in the extended time frame, all rights that are granted in the particular time frame are granted. However, in the case where no login is performed in the particular time frame and a login is performed for the first time in the extended time frame, some of the rights that are granted in the particular time frame may be granted.

In addition, in the above-described embodiment, when a login is performed every certain time period in the particular time frame, the right to execute the 10 consecutive reward lotteries is granted. However, the right that is granted when a login is performed is not limited to the 10 consecutive reward lotteries and may be, for example, in-game currency, a lottery item, etc.

Although an aspect of an embodiment has been described with reference to the accompanying drawings, it goes without saying that the present invention is not limited to the embodiments described above. It would be obvious that a person skilled in the art could conceive of various modifications and amendments within the scope recited in the claims, and it will be understood that those modifications and amendments obviously belong to the technical scope of the present invention.

What is claimed is:

1. A non-transitory computer readable medium storing a program causing a computer to execute a method comprising:
   storing login information when a player performs an initial login for a first time in a particular time frame, wherein the login information comprises information about the first time of the initial login in the particular time frame;
   granting a first right in response to a login being performed during a certain time period in the particular time frame;
   determining, using the login information, a difference between a start time of the particular time frame and the first time of the initial login;
   determining a number of rights to be granted to the player based on the difference between the start time of the particular time frame and the first time of the initial login,
      wherein the number of rights corresponds to a total amount of a plurality of rights that the player can use during the particular time frame; and
   granting, in response to the initial login not being detected in the certain time period and the certain time period in which the first right is not granted has elapsed when a login is performed in the particular time frame, the first right based on the certain time period in which the first right is not granted.

2. The non-transitory computer readable medium according to claim 1, wherein the method further comprises:
   not granting, in the case where the login information is stored and the certain time period in which the first right is not granted has elapsed, the first right for the certain time period that has passed without a login being performed, even when a login is performed again in the particular time frame.

3. The non-transitory computer readable medium according to claim 1,
   wherein an extended time frame is provided after the particular time frame, and
   wherein the method further comprises:
      granting, in the case where no login is performed in the particular time frame and a login is performed in the extended time frame, some or all of the rights that are to be granted in the particular time frame.

4. The non-transitory computer readable medium according to claim 1,
   wherein an extended time frame is provided after the particular time frame, and
   wherein the method further comprises:
      granting, in the case where no login is performed in the particular time frame and a login is performed in the extended time frame, some or all of the rights that are to be granted in the particular time frame.

5. The non-transitory computer readable medium according to claim 2,
   wherein an extended time frame is provided after the particular time frame, and
   wherein the method further comprises:
      granting, in the case where no login is performed in the particular time frame and a login is performed in the extended time frame, some or all of the rights that are to be granted in the particular time frame.

6. An information processing method comprising:
   storing login information when a player performs an initial login for a first time in a particular time frame, wherein the login information comprises information about the first time of the initial login in the particular time frame;
   granting a first right in response to a login being performed during a certain time period in the particular time frame;
   determining, using the login information, a difference between a start time of the particular time frame and the first time of the initial login;
   determining a number of rights to be granted to the player based on the difference between the start time of the particular time frame and the first time of the initial login,
      wherein the number of rights corresponds to a total amount of a plurality of rights that the player can use during the particular time frame; and
   granting, in response to the initial login not being detected in the certain time period and the certain time period in which the first right is not granted has elapsed when a login is performed in the particular time frame, the first right based on the certain time period in which the first right is not granted.

7. An information processing system comprising a computer configured_to perform a method comprising:
   storing login information when a player performs an initial login for a first time in a particular time frame, wherein the login information comprises information about the first time of the initial login in the particular time frame;
   granting a first right in response to a login being performed during a certain time period in the particular time frame and that;
   determining, using the login information, a difference between a start time of the particular time frame and the first time of the initial login;

determining a number of rights to be granted to the player based on the difference between the start time of the particular time frame and the first time of the initial login;
wherein the number of rights corresponds to a total amount of a plurality of rights that the player can use during the particular time frame; and
granting, in response to the initial login not being detected in the certain time period and the certain time period in which the first right is not granted has elapsed when a login is performed in the particular time frame, the first right of based on the certain time period in which the first right is not granted.

* * * * *